United States Patent
Shaked

(10) Patent No.: US 10,627,243 B2
(45) Date of Patent: Apr. 21, 2020

(54) COMBINED RASTER AND VECTOR DATA REPRESENTATION

(71) Applicant: Elbit Systems Ltd., Haifa (IL)

(72) Inventor: Arnon Shaked, Atlit (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 16/309,764

(22) PCT Filed: Jun. 15, 2017

(86) PCT No.: PCT/IL2017/050666
§ 371 (c)(1),
(2) Date: Dec. 13, 2018

(87) PCT Pub. No.: WO2017/221234
PCT Pub. Date: Dec. 28, 2017

(65) Prior Publication Data
US 2019/0242714 A1    Aug. 8, 2019

(30) Foreign Application Priority Data
Jun. 23, 2016 (IL) .......................................... 246446

(51) Int. Cl.
*G01C 21/32* (2006.01)
*G01C 21/20* (2006.01)
(Continued)

(52) U.S. Cl.
CPC ............. *G01C 21/32* (2013.01); *G01C 21/20* (2013.01); *G06F 16/29* (2019.01); *G06F 16/909* (2019.01); *G06T 11/001* (2013.01); *G06T 11/206* (2013.01)

(58) Field of Classification Search
None
See application file for complete search history.

(56) References Cited

U.S. PATENT DOCUMENTS 6,732,120 B1   5/2004   Du
8,849,942 B1*  9/2014   Foster ................. G06F 12/0862
                                                          709/213
(Continued)

FOREIGN PATENT DOCUMENTS

WO    WO20091117999 A    9/2009

OTHER PUBLICATIONS

Semantic, Spatial Data Models and Spatial Data structures, posted Apr. 2010, https://pdfs.semanticscholar.org/211a/c6ae85a0b42eee300bc08e91a92a6efb302c.pdf (Year: 2010).*

*Primary Examiner* — Sarah Le
(74) *Attorney, Agent, or Firm* — Gable Gotwals

(57) ABSTRACT

A map data structure and method and system for obtaining geographic information. Raw map data is converted into map data structure by generating an attribute layer for each geographic attribute according to a defined line pattern and line width, and defining a bit-array of fixed bit-length for each element of a grid representing geographic coordinates, where a bit value of "1" is assigned if a respective attribute is present at the grid element location and a bit value of "0" is assigned if the respective attribute is absent. A map image depicting selected geographic attributes may be generated and displayed from map data structure, by sequentially scanning each bit in bit-array in descending order of priority, for each grid element of selected location, and if binary value of scanned bit is "1" then attribute layer associated with bit is displayed according to assigned color value if attribute selected for display.

20 Claims, 12 Drawing Sheets

(51) Int. Cl.
  *G06F 16/909* (2019.01)
  *G06F 16/29* (2019.01)
  *G06T 11/00* (2006.01)
  *G06T 11/20* (2006.01)

(56) References Cited

U.S. PATENT DOCUMENTS

2006/0170693 A1* 8/2006 Bethune .................. G06T 3/40
  345/568
2010/0287207 A1 11/2010 Motoyama
2011/0316854 A1* 12/2011 Vandrovec ............ G06T 17/005
  345/420
2013/0262167 A1* 10/2013 Masood ............. G06Q 30/0641
  705/7.13
2014/0340421 A1* 11/2014 Otero .................... G06T 11/20
  345/619

* cited by examiner

| NO. | GEOGRAPHIC ATTRIBUTE | PRIORITY | BINARY VALUE | WIDTH (PIXELS) | PATTERN | COLOR SAMPLE | COLOR VALUE (R) | COLOR VALUE (G) | COLOR VALUE (B) |
|---|---|---|---|---|---|---|---|---|---|
| #1 | TRANSPARENT | N/A | 0000000000000000 | N/A | N/A | N/A | N/A | N/A | N/A |
| #2 | LAND | 1 | 0000000000000001 | N/A | N/A | PORTAFINO | 244 | 226 | 150 |
| #3 | OCEAN | 2 | 0000000000000010 | N/A | N/A | BLUE | 0 | 69 | 255 |
| #4 | LAND ICE | 3 | 0000000000000100 | N/A | N/A | GAINSBORO | 223 | 223 | 223 |
| #5 | VEGETATION - GRASS | 4 | 0000000000001000 | N/A | N/A | BRIGHT GREEN | 99 | 243 | 12 |
| #6 | VEGETATION - TREES | 4 | 0000000000001000 | N/A | N/A | BRIGHT GREEN | 99 | 243 | 12 |
| #7 | LAND CONTOUR LINES | 5 | 0000000000010000 | 2 | SOLID | LIGHT BROWN | 130 | 88 | 72 |
| #8 | BUILT-UP AREAS | 6 | 0000000000100000 | N/A | N/A | PUMPKIN ORANGE | 255 | 111 | 32 |
| #9 | RIVERS AND STREAMS | 7 | 0000000001000000 | 3 | SOLID | MAYA BLUE | 123 | 182 | 255 |
| #10 | INLAND WATER | 7 | 0000000001000000 | N/A | N/A | MAYA BLUE | 123 | 182 | 255 |

| NO. | GEOGRAPHIC ATTRIBUTE | PRIORITY | BINARY VALUE | WIDTH (PIXELS) | PATTERN | COLOR SAMPLE | COLOR VALUE (R) | COLOR VALUE (G) | COLOR VALUE (B) |
|---|---|---|---|---|---|---|---|---|---|
| #11 | CANAL AT GROUND LEVEL | 8 | 0000000010000000 | 2 | ⊤⊤⊤⊤⊤ | MINT BLUE | 185 | 247 | 239 |
| #12 | CANAL ABOVE GROUND | 8 | 0000000010000000 | 2 | ⊤⊤⊤⊤⊤ | MINT BLUE | 185 | 247 | 239 |
| #13 | TUNNELS | 9 | 0000000100000000 | 3 | DASHED | APPLE BLOSSOM | 166 | 83 | 83 |
| #14 | SECONDARY ROADS | 10 | 0000001000000000 | 2 | SOLID | SLATE BLUE | 151 | 151 | 255 |
| #15 | PRIMARY ROADS | 11 | 0000010000000000 | 4 | SOLID | CITRON | 126 | 132 | 23 |
| #16 | RAILROADS | 12 | 0000100000000000 | 2 | ┼┼ | BLACK | 0 | 0 | 0 |
| #17 | BRIDGES | 13 | 0001000000000000 | 3 | SOLID | APPLE BLOSSOM | 166 | 83 | 83 |
| #18 | PRIMARY BOUNDARY | 14 | 0010000000000000 | 2 | DASHED | INDIGO | 128 | 0 | 255 |
| #19 | INTERNATIONAL BOUNDARY | 15 | 0100000000000000 | 3 | DASHED | VIOLET | 173 | 82 | 167 |
| #20 | GRID | 16 | 1000000000000000 | 2 | SOLID | NAVY BLUE | 0 | 0 | 100 |

FIG. 3B

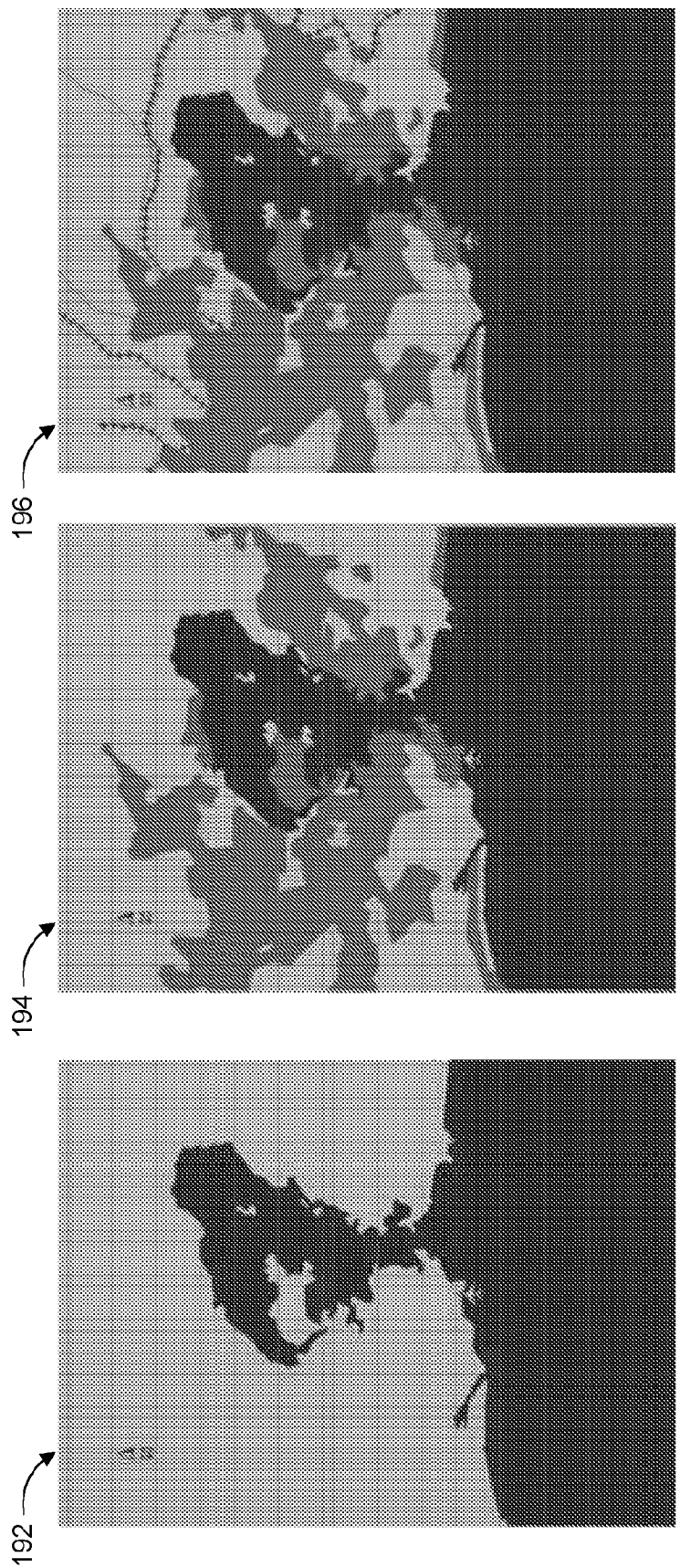

COMBINED RASTER AND VECTOR DATA REPRESENTATION

CROSS-REFERENCE TO RELATED APPLICATIONS

This United States application is the National Phase of PCT Application No. PCT/IL2017/050666 filed 15 Jun. 2017, which claims priority to Israeli Patent Application No. 246446 filed 23 Jun. 2016, each of which is incorporated herein by reference.

FIELD OF THE INVENTION

The present invention generally relates to geographic information systems, and to the storage, processing and displaying of geographic data.

BACKGROUND OF THE INVENTION

The entire surface of the earth can be referenced according to geographic coordinates indicating a precise spatial location. The geographic features present at each spatial location may be modelled and stored in the form of a digital map or model. Such maps may contain detailed information relating to topographical features of a terrain surface, including natural features such as mountains, hills, valleys, rivers and lakes, as well as artificial features such as roads, buildings, and monuments. Further mapping information may include terrain or land relief, such as the relative elevation, slope and orientation of land features. A geographic or geospatial information system (GIS) refers to any system designed to capture, store, organize and present the assortment of information relating to geographic features designated by spatial coordinates. Users may interactively process, analyze and visualize the spatial information via a specific GIS application or program. These tools can be applied to a diverse range of technical fields, ranging from public infrastructure management (e.g., roads, water, sewage), and transportation planning, to natural resource exploration and environmental supervision (e.g., fire prevention, managing national disasters).

The geographical information may be digitally represented in the form of a vector data model or a raster data model. In a vector data representation, the features of a terrain surface are designated geometrically as points, lines and polygons. Each point feature is represented as a single coordinate pair, while line and polygon features are represented as ordered lists of vertices. Each vector feature is associated with attributes that describe certain properties or characteristics of the respective feature. The vector features are generally grouped into "layers", where the features in a given layer include the same geometry type and the same kinds of attributes. For example, information about species of trees may be categorized in a "trees layer", while the types and shapes of roads and streets may be found in a "roads layer".

Raster data organizes the terrain surface as a grid of cells or pixels, where each pixel contains an attribute value and location coordinates. Unlike a vector structure, which stores coordinates explicitly, raster data coordinates are contained in the ordering of the grid or matrix. Groups of cells that share the same value represent the same type of geographic feature. A raster image may also be referred to as a bitmap or a pixel map. Whereas raster data is made up of evenly spaced pixels, the points (or lines or polygons) in a vector data model need not be evenly spaced. Vector models are typically more useful for representing regions that have a discrete boundary, such as a street or a city, whereas a raster model is preferable for representing continuously varying data, such as elevation data.

Vector models have certain advantages, such as the ability to represent data at its original resolution, while the image resolution is limited by the pixel size in raster data. However, there are also disadvantages associated with vector models. One issue is the considerable amount of information contained in a vector dataset, which includes numerous data types, values and formats. As a result, a GIS application that utilizes this information requires substantial processing for executing the necessary computing tasks, such as reading, filtering and displaying the vector data, which also places further constraints on the application designer. This problem is exacerbated for applications that need to respond in "real-time", such as digital map displays for fighter pilots.

An additional problem is that vector data models are geographically non-uniform. For example, a desert or other barren land area will contain very little information concerning bodies of water, in contrast to a land area in a tropical climate which will have an abundance of bodies of water. This non-uniformity leads to difficulties when attempting to establish a "maximum limit" for the amount of data in each category (or vector layer) when formulating a GIS application. In particular, it is difficult for the application designer to allocate sufficient processing resources for displaying information in a selected category, since the amount of resources that will actually be required cannot be known in advance. This problem leads to prolonged loading times and delays when displaying vector layers, since the application encounters complications in retrieving and displaying the relevant information.

One technique for handling the aforementioned issues is to dilute or filter the collection of information stored in the vector data model. Data that is not directly utilized by the application can be removed before the application is executed. While this approach saves the application from dealing with extraneous data, it also requires pre-processing the information, further pre-processing prior to every update, and potentially eliminating information that may turn out to be useful, as well as providing a lack of uniformity in the distribution of the diluted information.

An alternative technique is to initially organize the vector data in a more efficient configuration. This generally involves modifying the format in which the data is stored, and creating a search tree data structure for locating specific data values more efficiently. Although the searching process may be improved with this approach, there also remains a substantial amount of extraneous data, and an expansion in the overall stored information due to the data-intensive search trees. The reorganized information is also distributed in a non-uniform manner.

Yet another approach is to convert the vector data model into a raster data format, using a suitable conversion application. A raster image allows displaying information in real-time, as the data set has a fixed size limit (the bitmaps are generally designated with a particular size for a given terrain area). However, some information may be lost in the conversion to a raster image, since the initial vector layers are no longer represented distinctly. Moreover, the raster data requires a large amount of disk space, and transferring the raster data from the disk to a local processing memory of the application to allow displaying can be quite time-consuming.

U.S. Pat. No. 5,715,331 to Hollinger, entitled: "System for generation of a composite raster-vector image", is directed to an image processing system for creating a composite raster-vector image from a raster only image. Edges in a raster image are detected and used to create a partial vector image, which is then combined with the original raster image to create a composite image. The composite image can be manipulated without distortion. In order to display or print the image, the vector image data is rasterized and merged with the raster image data. The data in the raster image can be smoothed by eliminating information contained in the vector image.

U.S. Pat. No. 6,732,120 to Du, entitled: "System and method for processing and display of geographical data", discloses a display system with a graphical display area of visual information depicting a map region of interest coordinated to a display area of textual information of groups of user defined categories. The user defined categories group objects having like attributes to form a collection of such objects. Each object of the group references a location in the geographic display area. The user defined categories are capable of further coordination with a user controllable tab list display area of information identifying particulars of each of the objects or members of the category group. In another aspect, geographic data defining a spatial extent is modelled and stored in a relational database. The spatial extent of a given hierarchical level is partitioned into cells, and a unique cell identifier or spatial index is assigned to each cell. Each geographic object is assigned a unique cell identifier defined by the cell in which the object is located. The geographic objects in each hierarchical level are grouped by their unique cell identifiers to form grouped objects, which are stored as a long binary field in a relational database record corresponding to the cell identifiers.

U.S. Pat. No. 7,684,612 to Berrill, entitled: "Method and apparatus for storing 3D information with raster imagery", discloses a method for storing three-dimensional (3D) information within the pixel information of an image. A plurality of images is acquired and combined to form a single image, and X-parallax information is stored with the pixel data of the single image. In particular, an X-parallax value is stored between stereoscopic images with the typical pixel information, such as by increasing the pixel depth, so that only a single image needs to be stored, whether a mosaic of multiple images or a partial image, to allow for proper reconstruction of 3D objects.

U.S. Pat. No. 7,933,451 to Kloer, entitled: "Feature extraction using pixel-level and object-level analysis", discloses an image processing method for extracting a feature from a GIS digital image. A pixel-level cue algorithm is executed to identify an interesting area of a raster image depicting physical objects. A pixel-level probability that the identified interesting area represents the feature is determined, using a result from the pixel-level cue algorithm. The pixel-level probability is compared to a pixel-level cue threshold. If the pixel-level probability satisfies the pixel-level threshold, then a portion of the raster image is converted to a vector layer, an object-level cue algorithm is executed on the vector layer to identify an interesting area, an object-level probability is determined that the identified interesting area is the feature using a result from the pixel-level cue algorithm, and the object-level probability is compared to an object-level cue threshold.

U.S. Pat. No. 9,171,485 to Gautama et al, entitled: "Geodatabase information processing", discloses a system for updating and/or extending geodatabases with geo-information. An input means obtains vector-based data from location aware devices, and a data processor inserts information from the vector-based data into a raster-based data structure comprising data container elements corresponding with topologically arranged locations. A data voting unit adds information from the vector-based data individually to selected data container elements. The data processor derives geo-information based on the raster-based data structure and the inserted information from the vector-based data.

SUMMARY OF THE INVENTION

In accordance with one aspect of the present invention, there is thus provided a computer-implemented data structure for use in obtaining geographic information at a computing device. The map data structure includes a grid of elements representing spatial coordinates of a geographical area. Each of the grid elements includes a bit array of fixed bit-length, where each bit of at least a portion of the bit-array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit-array provides an indication of the geographic attributes at the respective location of the grid element. Each respective geographic attribute may be encoded as an attribute layer that includes a line pattern and a line width. The attribute layer may include a color value for displaying the respective geographic attribute. The attribute layer may include a priority value designating an order for decoding the attribute layers of the grid element. At least one sequence of bits of the bit-array may be associated with a respective attribute layer, such that the binary value of one bit in the sequence indicates the existence of the respective geographic attribute at the respective location, and the binary value of at least another bit in the sequence provides further information relating to the respective geographic attribute at the respective location. At least a portion of the bit-array of the grid element may indicate a transition to an adjacent grid element for the respective geographic attribute associated with the bit-array portion. The collection of attribute layers may be represented as a set of files including a partitioning of the geographical area at a selected map scale.

In accordance with another aspect of the present invention, there is thus provided a method for obtaining geographic information. The method includes the procedure of retrieving geographic information relating to a selected location of a geographical area, by extracting at least one geographic attribute at the selected location from a map data structure including a grid of elements representing spatial coordinates of the geographical area. Each of the grid elements includes a bit array of fixed bit-length, where each bit of at least a portion of the bit array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit array provides an indication of the geographic attributes at the respective location of the grid element. The method may further include the preliminary procedure of converting a map data representation of the geographic area into the map data structure, by generating an attribute layer for each geographic attribute according to a defined line pattern and line width, and defining a bit-array for each element of the grid. Generating an attribute layer may further include assigning a color value for displaying the respective geographic attribute of the attribute layer. Generating an attribute layer may further include assigning a priority value designating an order for decoding the attribute layers of the grid element. The method may further include the procedure of generating and displaying a map image depicting selected geographic attributes at the selected location, by sequentially scanning each bit in the bit-array of a grid element in descending order of priority, for each grid element of the selected location, and if the bit value of the scanned bit is "1" and the geographic attribute associated with the bit is selected, then displaying the associated geographic attribute layer according to the assigned color. The map image may be displayed in alignment with a designated line-of-sight vector. The selected location of a geographical area may include the real-time location of a moving platform.

In accordance with a further aspect of the present invention, there is thus provided a computing device that includes a processor executing a map data application configured to retrieve geographic information relating to a selected location of a geographical area, by extracting at least one geographic attribute at the selected location from a map data structure including a grid of elements representing spatial coordinates of the geographical area. Each of the grid elements includes a bit array of fixed bit-length, where each bit of at least a portion of the bit array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit array provides an indication of the geographic attributes at the respective location of the grid element. The computing device may further include a display, configured to display a map image depicting selected geographic attributes at the selected location, where the map data application is configured to generate the map image by sequentially scanning each bit in the bit-array of a grid element in descending order of priority, for each grid element of the selected location, and if the bit value of the scanned bit is "1" and the geographic attribute associated with the bit is selected, then the associated geographic attribute layer is displayed according to the assigned color. The map image may be displayed in alignment with a designated line-of-sight vector. The computing device may further include a location indicator, configured to determine the real-time location of the computing device, where the selected location of a geographical area includes the determined real-time location of the computing device. The computing device may further include a user interface, configured to receive user instructions, where the map data application updates the map image in accordance with the user instructions.

In accordance with yet another aspect of the present invention, there is thus provided a system for obtaining geographic information over a network. The system includes a database including a map data structure that includes a grid of elements representing spatial coordinates of a geographical area. Each of the grid elements includes a bit array of fixed bit-length, where each bit of at least a portion of the bit array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit array provides an indication of the geographic attributes at the respective location of the grid element. The system further includes a map data application operating on a client computing device communicatively coupled with the database over a network. The map data application is configured to retrieve geographic information relating to a selected location of the geographical area, by extracting at least one geographic attribute at the selected location from the map data structure. The system may further include a map data encoder, operating on a server computing device communicatively coupled with the database over a network. The map data encoder is configured to encode the map data structure by converting a map data representation of the geographic area into the map data structure, by generating an attribute layer for each geographic attribute according to a defined line pattern and line width, and defining a bit-array for each element of the grid. The generated attribute layer may be assigned a color value for displaying the respective geographic attribute of the attribute layer. The generated attribute layer may be assigned a priority value designating an order for decoding the attribute layers of the element. The map data application may be configured to generate and display a map image depicting selected geographic attributes at the selected location, by sequentially scanning each bit in the bit-array of a grid element in descending order of priority, for each grid element of the selected location, and if the bit value of the scanned bit is "1" and the geographic attribute associated with the bit is selected, then the associated geographic attribute layer is displayed according to the assigned color. The map image may be displayed in alignment with a designated line-of-sight vector. The selected location of a geographical area may include the real-time location of the client computing device determined by a location indicator.

BRIEF DESCRIPTION OF THE DRAWINGS

The present invention will be understood and appreciated more fully from the following detailed description taken in conjunction with the drawings in which:

FIG. 3A is a first section of a chart depicting an exemplary mapping of geographic attributes in an alternate map data structure, operative in accordance with an embodiment of the present invention;

FIG. 3B is a second section of a chart depicting an exemplary mapping of geographic attributes in an alternate map data structure, operative in accordance with an embodiment of the present invention;

FIG. 6A is a schematic illustration of a map image depicting a first set of attribute layers, operative in accordance with an embodiment of the present invention;

FIG. 6B is a schematic illustration of a map image depicting a second set of attribute layers overlaid on the map image of FIG. 6A, operative in accordance with an embodiment of the present invention;

FIG. 6C is a schematic illustration of a map image depicting a third set of attribute layers overlaid on the map image of FIG. 6B, operative in accordance with an embodiment of the present invention;

DETAILED DESCRIPTION OF THE EMBODIMENTS

The present invention overcomes the disadvantages of the prior art by providing a system and method for representing geographical information, such as map data, in a format that enables the efficient extraction, retrieval and displaying of selected information to a remote user operating a GIS application.

Figure 1:
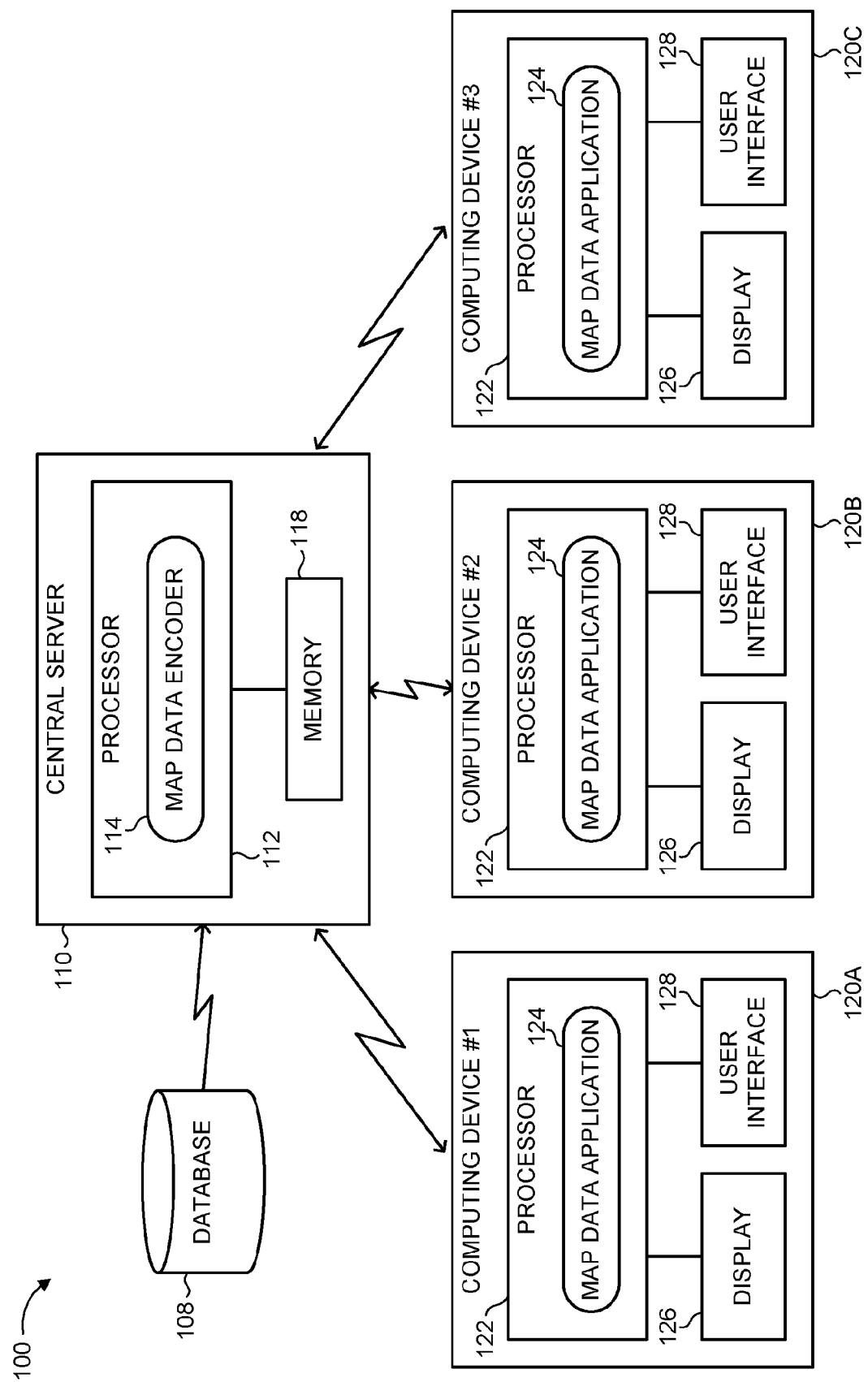
FIG. 1 is a schematic illustration of a system for representing and obtaining geographical information, constructed and operative in accordance with an embodiment of the present invention.

Reference is now made to FIG. 1, which is a schematic illustration of a system, generally referenced 100, for representing geographical information, constructed and operative in accordance with an embodiment of the present invention. System 100 includes a database 108, a central server 110, and a plurality of computing devices 120A, 120B, 120C. Server 110 includes a processor 112 and a memory 118. Each of computing devices 120A, 120B, 120C includes, respectively, a processor 122, a display 126, and a user interface 128. Server 110 is communicatively coupled with database 108 and with each of computing devices 120A, 120B, 120C. In particular, database 108 and/or computing devices 120A, 120B, 120C may convey information to/from server 110 over any suitable data communication channel, using any type of channel model (digital or analog) and using any transmission protocol (e.g., radio, HF, wireless, WiFi, Bluetooth, and the like). Accordingly, server 110 and computing devices 120A, 120B, 120C may also include transceivers (not shown) operative for transmitting and/or receiving data signals over a communications channel.

Central server 110 is a dedicated computer server that contains at least a processor 112 and a memory unit 118. Processor 112 includes a map data encoder 114. Server 110 is typically remotely located from each of computing devices 120A, 120B, 120C.

Computing devices 120A, 120B, 120C may be embodied by any type of handheld mobile communication device operative for two-way wireless communication over a cellular or other wireless network, such as a mobile phone, a smartphone, a netbook computer, a tablet computer, a portable media player, a personal digital assistant (PDA), or any combination of the above. Each computing device 120 includes, or is accessible to, at least a map data application 124, such as a GIS program configured to process, analyze and display information relating to the geographic features of a selected environmental location.

Each computing device 120 further includes, or is coupled with, a display 126 that is configured to present visual content to a user of computing device 120. For example, display 126 may be embodied by the display screen of computing device 120, or alternatively may be a separate display device, such as a head-up display (HUD) (e.g., integrated with the windshield of a vehicle or aircraft cockpit), or a head-mounted display (HMD) embedded within a wearable apparatus worn by the user (e.g., a helmet, a headband, a visor, or spectacles). Display 126 may optionally be a partially transparent or a "see-through display", such that the user can simultaneously observe images, symbols, or other visual content superimposed onto the display screen, along with a view of the physical environment viewed through the display.

Each computing device 120 further includes, or is coupled with, a user interface 128 that allows the user to control various parameters or settings associated with computing device 120. For example, user interface 128 allows the user to provide instructions to map data application 124, such as to select certain image information to be displayed (as will be discussed further hereinbelow). User interface 128 may include switches and buttons, a cursor, and/or a touch-screen menu interface, such as a graphical user interface, configured to enable the user to manually enter instructions or data. User interface 128 may also include communication devices configured to provide voice communication, such as a microphone and an audio speaker, as well as voice recognition capabilities to enable the user to enter instructions or data by means of speech commands. User interface 128 may also be used to communicate with external sources, such as with users of other computing devices 120 or with a technical support program of map data application 124.

Computing device 120 may further include a location indicator (not shown) operative for providing an estimate of the current geographical position of the respective computing device 120. For example, the location indicator may include components and applications associated with a global positioning system (GPS) or other global navigation satellite systems (GNSS) known in the art. The location indicator may also include location based service applications executable by the computing device 120 or by a separate platform at which the user is located. For example, computing device 120 may obtain the location and driving route of a vehicle that the user is driving via a vehicle navigation system (e.g., using a GPS and/or digital map), and may also obtain other real-time parameters of the vehicle, such as velocity and acceleration, to allow determination of an updated location over time. Similarly, computing device 120 may obtain the location and flight route of an aircraft that the user is piloting via aircraft sensors and information systems (ASIS) configured to measure or detect real-time flight information associated with the aircraft, such as: the location, heading, altitude, airspeed, velocity, rate of turn, course deviation, and the like.

Computing device 120 may further include a line-of-sight detector (not shown), such as a head tracking device and/or an eye tracking device, for detecting and indicating the line-of-sight (LOS) of a user of computing device 120. The indicated LOS may represent a selection of a current or future geographical position of computing device 120 for use by map data application 124. For example, if the user is an aircraft pilot, the real-time LOS of the pilot may represent the geographical location(s) for which application 124 should retrieve and display map data to the pilot.

Database 108 stores relevant information that is retrieved and managed by central server 110, including digital maps or models that contain images and detailed information relating to geographic features present in real-world environments. For example, database 108 may include a 3D geographic model that includes a three-dimensional representation of the entire Earth or of a particular area, region or territory of interest. A 3D model generally includes imagery and texture data relating to geographical features and terrain, including artificial features (e.g., buildings, monuments, and the like), such as the location coordinates of such features and different views thereof (e.g., aerial views acquired via satellite imagery or aerial photography, and/or street level views). The 3D model may also provide a plurality of visual representations of the geographical terrain of a region of interest at different positions and viewing angles (e.g., allowing manipulation operations such as zooming, rotating, perspective shifting, and the like). Database 108 may include actual geographic images, or may include image data that allows for image reconstruction. Database 108 may also store supplementary image content associated with different landmarks or geographic locations, such as in the form of symbols, text, or other graphic designs, to be selectively displayed together with the relevant geographic images.

Processor 112 generally performs any necessary data processing required by server 110. For example, map data encoder 114 receives and processes map data stored in database 108, such as to convert vector map data representing geographic information into an alternative data representation (as will be discussed further hereinbelow). Processor 112 may receive instructions from other components of system 100, such as instructions from a computing device 120 to retrieve information associated with a selected geographic attribute (as will be discussed further hereinbelow).

According to an embodiment of the present invention, system 100 may be configured to retrieve and display real-time map information associated with a moving user, such as a user located on a vehicle or another type of moving platform. For example, the user of a computing device 120 may be an aircraft pilot or aircraft navigator, and system 100 may retrieve and display map images along a flight route of the aircraft in real-time.

The components and devices of system 100 may be based in hardware, software, or combinations thereof. It is appreciated that the functionality associated with each of the devices or components of system 100 may be distributed among multiple devices or components, which may reside at a single location or at multiple locations. For example, the functionality associated with processor 112 or processor 122 may be distributed between multiple processing units. Similarly, at least part of the functionality associated with map data application 124 may reside externally to computing device 120. System 100 may optionally include and/or be associated with additional components not shown in FIG. 1, for enabling the implementation of the disclosed subject matter. For example, computing device 120 may further include a memory or storage unit (not shown) for temporary storage of images or other types of data.

Figure 2:
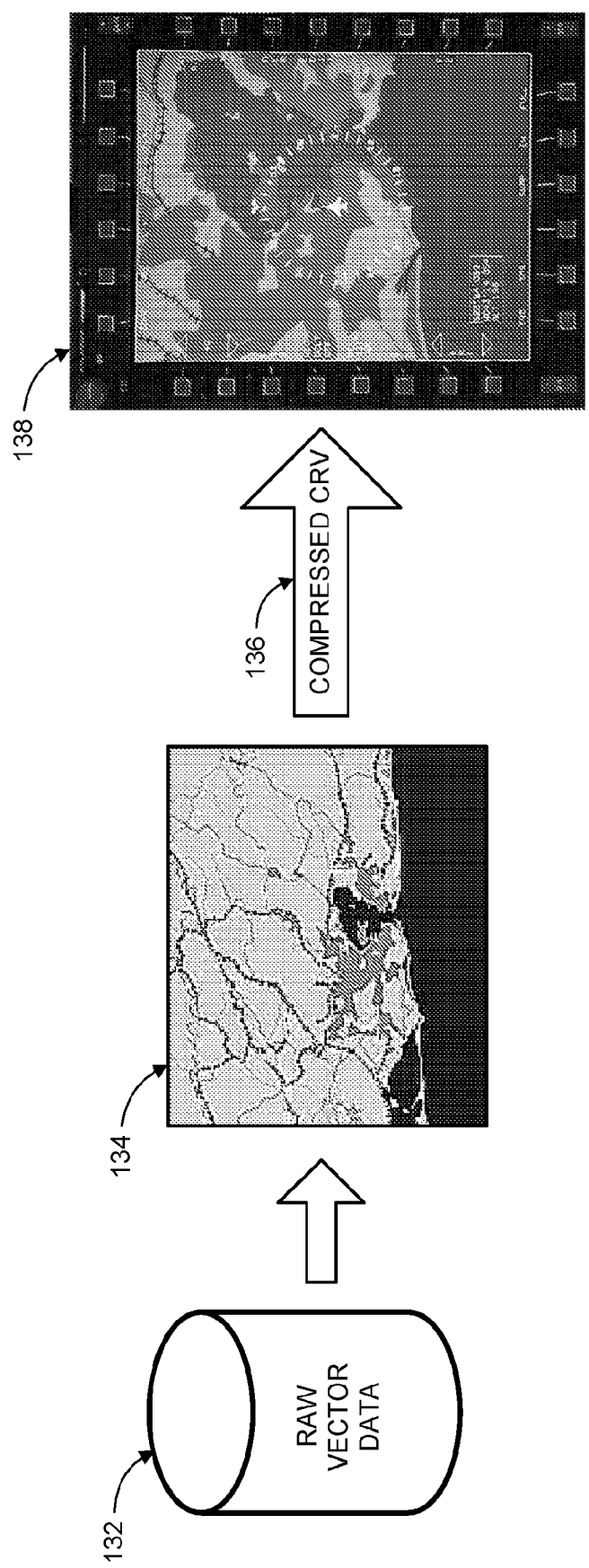
FIG. 2 is a schematic illustration of the encoding and compression of map data into an alternate representation, operative in accordance with an embodiment of the present invention.

The operation of system 100 will now be described in general terms, followed by specific examples. Reference is made to FIG. 2, which is a schematic illustration of the encoding and compression of vector map data into an alternate representation, operative in accordance with an embodiment of the present invention. Database 108 stores raw vector data, referenced 132, representing a map of a particular geographic region in a vector data model. Server processor 112 obtains raw vector data 132 from database 108, and map data encoder 114 converts the raw vector data 132 into an alternate data representation, referenced 134, visually depicted as an image for exemplary purposes. Alternate data representation 134 can be considered a "combined raster and vector" data format, as will be elaborated upon further hereinbelow. Accordingly, the terms "alternate data representation/model/structure" and "combined raster and vector (CRV) data representation/model/structure" are used interchangeably herein. After the CRV data 134 is generated, map data encoder 114 compresses the CRV data 134 with a lossless compression format, producing compressed CRV data, referenced 136, which is then stored in memory 118 of central server 110 and/or in database 108. It is noted that encoder 114 may alternatively generate CRV map data 134 from a non-vector data model (e.g., a raster data model) or a partially vector data model, rather than raw vector data 132, which is described herein as the initial data set for exemplary purposes. A map data application 124 operating on a remote computing device 120 may then retrieve selected geographic information relating to CRV data 136, for processing and indication to a user of computing device 120. For example, application 124 may generate a visual representation, referenced 138, of selected CRV data layers representing particular geographic attributes at a particular spatial location, to be displayed on display 126 of computing device 120.

The map data or geographic information is stored in CRV data model 134 in the form of a grid of elements corresponding to spatial coordinates of a geographic location, as in a raster data model. However, the content of each grid element encodes the "vector data layers" stored in raw vector data 132 and relevant to the particular geographic attributes represented by the respective grid element. In particular, each grid element is associated with a vector or a bit-array, where an individual bit of the bit-array represents one or more geographic attributes (or "vector layers") at the respective spatial location. The bit-array of the grid element is assigned a particular binary value that represents the characteristics of the geographic attributes at the spatial location, where a selected bit corresponds to a selected attribute. Accordingly, the bit-array has a fixed predetermined bit-length that corresponds to a minimum number of geographic attributes associated with the grid element. For example, each grid element may include a bit-array that has a binary value of 16 bits, allowing for (at least) 16 different geographic attributes to be associated with that element location.

Reference is now made to FIGS. 3A and 3B. FIG. 3A is a first section of a chart, referenced 140, depicting an exemplary mapping of geographic attributes in an alternate map data representation, operative in accordance with an embodiment of the present invention, and FIG. 3B is the second section of the chart 140 of FIG. 3A. Chart 140 shows 20 different geographic attributes (or "map data layers"), which are associated with each element in an example CRV data model. Each geographic attribute is shown with a 16-bit binary value, which represents the relevant bit for that attribute in the bit-array of the grid element. In particular, each bit in the bit-array represents at least one geographic attribute at the spatial location represented by that grid element, where the respective bit indicates whether the geographic attribute is present or lacking at that spatial location. Chart 140 includes the following 20 geographic attributes or map data layers: "transparent"; "land"; "ocean";

"land ice"; "vegetation—grass"; "vegetation—trees"; "land contour lines"; "built-up areas"; "rivers and streams"; "inland water"; "canal at ground level"; "canal above ground level"; "tunnels"; "secondary roads"; "primary roads"; "railroads"; "bridges"; "primary boundary"; "international boundary"; and "grid". For example, the vegetation-trees attribute (layer #6) represents whether or not a forest is present at the geographic location represented by that grid element, whereas the railroads attribute (layer #16) represents whether there is a railroad located at the geographic location. The "transparent" attribute indicates that none of the other geographic attributes exist at that geographic location.

Each layer is assigned a binary value representing the relevant bit for that attribute in the element bit-array. For example, the ocean attribute (layer #3) has the binary value: "0000000000000010", denoting that the $2^{nd}$ bit position (assuming a numbering scheme where the least significant bit (LSB) is considered bit position #1) of the element bit-array represents whether or not there is an ocean at the gird element location. Similarly, the tunnels attribute (layer #13) has the binary value: "0000000100000000", denoting that the $9^{th}$ bit position of the bit-array indicates whether a tunnel is present at that location.

Chart 140 also shows additional information linked to each layer (geographic attribute), used for encoding or for decoding/displaying the CRV map data. Each layer may be assigned a particular "line pattern" and a "pattern width". The line pattern denotes a line format to visually represent the respective geographic attribute when encoding the grid elements, and the pattern width denotes the width (or "thickness") of the line as a number of pixels. For example, the "rivers and streams" attribute (layer #9) is encoded as a solid line of 3 pixels in width, while the "primary boundaries" attribute (layer #18) is encoded as a dashed line of 2 pixels in width. Thus, the CRV map data encoding of a grid element at which a river is present includes a solid line of 3 pixels in width. The pattern may generally include various forms, such as: a fill pattern, a solid line, a dashed line, a feathered line, and the like.

Each layer may be further assigned a particular color, with which the respective geographic attribute will be displayed. The color may be represented using a Red Green Blue (RGB) color format. For example, the "vegetation-trees" attribute (layer #6) is characterized with a color value of R=99; G=243; B=12, corresponding to a "bright green" color, whereas the "canal" attributes (layers #11 and #12) are both characterized with a color value of R=185; G=247; B=239, corresponding to a "mint blue" color. Thus, when displaying the CRV map data layers, forests are displayed as bright green and canals are displayed as mint blue on the respective grid elements (i.e., at which a forest or canal is present). Each layer may be further assigned a priority level, denoting the order in which the layers of a respective grid element are decoded or displayed (as will be discussed further below). For example, the "secondary roads" attribute (layer #14) is assigned a priority value of "10", whereas the primary roads attribute (layer #15) is assigned a higher priority value of "11", denoting that the primary roads layer will be checked and displayed (if applicable) before the secondary roads attribute, for a given grid element. The highest priority layer(s) will be checked (and displayed) first, followed by the next highest priority layer(s), and so forth. The priority of a layer may be linked to the bit position associated with that layer in the element bit-array. For example, the most significant bit (MSB) in the bit-array may represent the highest priority layer(s) while the least significant bit (LSB) may represent the lowest priority layer(s).

Figure 4A:
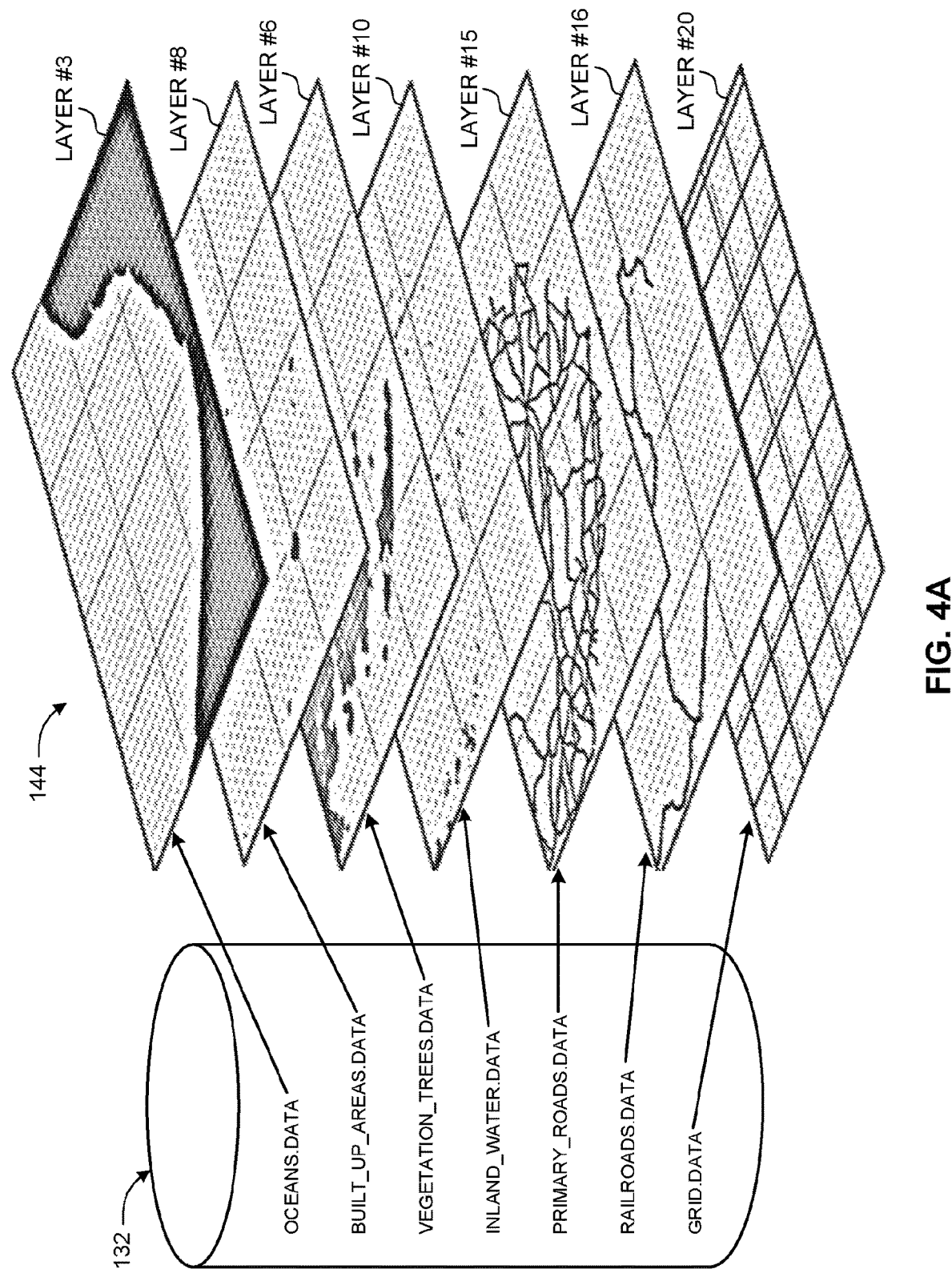
FIG. 4A is a schematic illustration of generating geographic attribute layers for encoding an alternate map data structure, operative in accordance with an embodiment of the present invention.

Reference is now made to FIG. 4A, which is a schematic illustration of generating geographic attribute layers for encoding an alternate map data structure, operative in accordance with an embodiment of the present invention. Map data encoder 114 (FIG. 1) obtains vector layer information from vector map model 132, and generates corresponding geographic attribute layers, generally referenced 144. FIG. 4A depicts the following exemplary layers 144, corresponding to geographic attributes in conjunction with chart 140 (FIGS. 3A and 3B): "oceans" (layer #3); "built-up areas" (layer #8); "vegetation-trees" (layer #6); "inland water" (layer #10); "primary roads" (layer #15"); "railroads" (layer #16); and "grid" (layer #20). Each of the vector layers is represented as a respective data file ("attribute.data") in vector model 132. For example, map data encoder 114 retrieves an "oceans" data file from vector model 132, and generates a corresponding "oceans" attribute layer for encoding in the CRV data model. Each layer is generated according to the defined line pattern and line width associated with the layer (e.g., as depicted in chart 140). The pattern can be, for example, a "fill pattern", a solid line, a dashed line, a feathered line, and the like. The layers 144 are generated in the order of their defined priorities. For example, the grid layer (layer #20) is assigned the highest priority value of 16 (referring to chart 140), and is thus generated first, followed by the railroads layer (layer #16) which has the next highest priority value of 12 (from the exemplary layers depicted), and so forth. The generated attribute layers can thus be considered visually as multiple planar surfaces overlaid on top of one another in descending order of priority, i.e., with the highest priority layer at the bottom and the lowest priority layer at the top, as depicted in FIG. 4A. It is noted that the generated attribute layer defines the geographical coverage of the respective attribute. For example, if a layer includes a line pattern of 2 pixels in width, and each pixel represents 150×150 meters, then the line width would represent 300 meters. It is further noted that the categories of information for each bit-layer depicted in chart 140 represent examples only, and may be substituted with additional and/or alternative data categories.

Figure 4B:
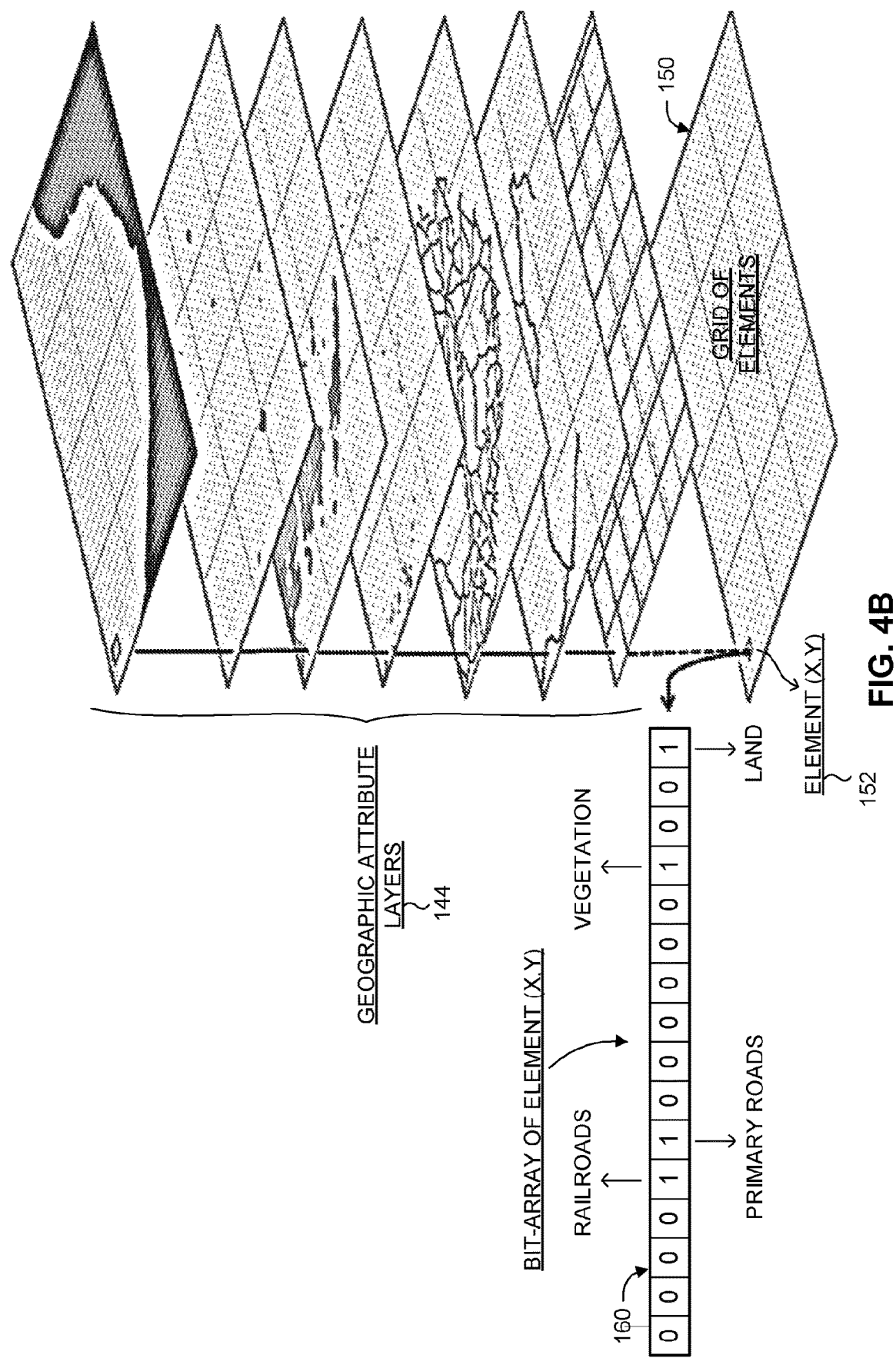
FIG. 4B is a schematic illustration of encoding the alternate map data structure with the geographic attribute layers of FIG. 4A, operative in accordance with an embodiment of the present invention.

Reference is now made to FIG. 4B, which is a schematic illustration of encoding the alternate map data structure with the geographic attribute layers of FIG. 4A. The CRV map data structure encodes a grid of elements, generally referenced 150, where each element (e.g., "pixel") represents spatial coordinates of a geographic area. Map data encoder 114 (FIG. 1) scans each element of grid 150 to be encoded, determines which attributes are present at the geographic location of that grid element, and then encodes the relevant attribute layers for the element. In particular, each grid element is encoded with a bit-array having a binary value that informs the geographic attributes at the grid element location. Each bit of the bit-array is linked to a respective geographic attribute (or attribute layer). For each element, map data encoder 114 determines for each layer if the respective attribute is present at the geographical location of the grid element. If the attribute is present, the corresponding bit in the bit-array is assigned a "1", whereas if absent the corresponding bit is assigned a "0".

For example, grid element 152 at coordinate location (x,y) is encoded with bit-array 160 having a binary value of: "0000110000001001". The $1^{st}$ bit position (LSB=1) of bit-array 160 has a value of "1", indicating the presence at coordinate location (x,y) of the geographic attribute of the attribute layer linked with the $1^{st}$ bit position (i.e., the "land"

attribute). The $2^{nd}$ bit position of bit-array 160 has a value of "0", indicating the absence of the geographic attribute of the respective attribute layer (i.e., the "ocean" attribute) at coordinate location (x,y). The remainder of bit-array 160 indicates the presence or absence of the other geographic attributes, accordingly. Specifically, coordinate location (x,y) is further characterized as having: vegetation (bit position #4), primary roads (bit position #11), and railroads (bit position #12). The other grid elements of grid 150 are encoded in a corresponding manner with their respective bit-arrays. The encoded grid elements may represent any portion of a geographic area (e.g., only a subsection of the elements of grid 150 may actually be encoded and/or grid 150 may represent a subsection of a larger geographic area).

Optionally, map data encoder 114 may dedicate a certain number of bits in the bit-layer to provide additional information relating to the geographic attributes at the element location. In other words, an element bit-array of the CRV data structure may include information relating to both the existence of the geographic attribute (attribute layer), as well as details or characteristics of the corresponding attribute layer. For example, supposing a CRV data structure that represents only four different attribute layers, then the 16-bit bit-array assigned to a given grid element can be divided into four vectors or "sub-arrays" of four sequential bits, where each sub-array is associated with one of the four represented layers. The first bit in each sub-array can indicate the existence or absence of the respective attribute layer, and the other three bits can encode additional information, such as the layer color for subsequent display of the attribute layer.

The geographic attribute layers are represented as sets of files in the CRV data structure, where each file set represents a partitioning of the geographic area at a certain map scale factor. The grid elements of the respective geographic attribute layers (represented as files) in a given file set have a uniform area size. For example, a first set of files may correspond to a map scale of 1:1,000,000 with grid elements of 150×150 square-meters, while a second set of files may correspond to a map scale of 1:2,000,000 with grid elements of 300×300 square-meters. Accordingly, the same geographic attribute may be represented in different grid elements of different files sets. For example, geographic layers 144 shown in FIGS. 4A and 4B may collectively define a first file set (i.e., "File Set A") of grid 150 (representing a given geographic area) at a first map scale factor and grid element size, whereas a different file set (i.e., "File Set B") may be defined for the same geographic area of grid 150 at a different map scale factor and grid element size, such that the corresponding files of a selected attribute layer (e.g., layer #3) may be encoded differently in the two file sets (due to the different map scaling factor and/or number or size of grid elements). The use of different file sets may allow for the rapid retrieval of information by a map data application 124 (FIG. 1) when displaying a map at a given map scale, and may provide the capability to present information relating to multiple geographic attributes at different map scales.

Figure 4C:
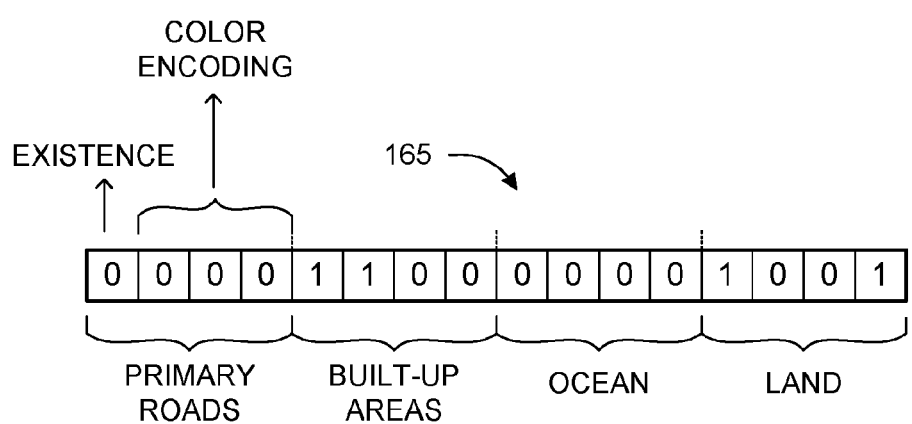
FIG. 4C is a schematic illustration of an alternative element bit-array encoding format, operative in accordance with another embodiment of the present invention.

Reference is made to FIG. 4C, which is a schematic illustration of an alternative element bit-array encoding format, operative in accordance with another embodiment of the present invention. An exemplary CRV data structure includes four different geographic attribute layers: "roads" ($1^{st}$ layer); "built-up areas" ($2^{nd}$ layer); "oceans" ($3^{rd}$ layer); and "land" ($4^{th}$ layer). A given grid element is encoded with a bit-array, referenced 165, having a binary value of: "0000110000001001". The first four bits (bit positions #1-4, assuming LSB=1) in bit-array 165 are assigned to the $1^{st}$ layer ("land"), the next four bits (bit positions #5-8) are assigned to the $2^{nd}$ layer ("oceans"), the next four bits (bit positions #9-12) are assigned to the $3^{rd}$ layer ("built-up areas"), and the final four bits (bit positions #13-16) are assigned to the $4^{th}$ layer ("roads"). For each "sub-array" of bit-array portion, the MSB bit position indicates the existence of the geographic attribute of the respective layer, while the remaining three bits indicate the color for displaying the respective layer, using a 3-bit color encoding format (such that 8 different colors are possible). In particular, the $1^{st}$ four bits of bit-array 165 have a binary value of "1001". The MSB bit of this sequence (bit position #4) has a value of "1", indicating that the land attribute is present at the location of the grid element. The next 3 bits if the sequence (bit positions #3, #2, #1) have a binary value of "001", indicating that the land layer should be displayed in the corresponding color (represented by a "1" value). The next four bits (bit positions #5-8) of bit-array 165 have a binary value of "0000", indicating that the oceans layer is absent at the element location (bit position #8), and no layer color is displayed (bit positions #7, #6, #5). Similarly, the built-up areas layer is indicated as being present (bit position #12) while the primary roads layer is indicated as absent (bit position #16). The sub-array representing an attribute layer may also dedicate a number of bits for encoding characteristics relating to the respective attribute. For example, the "roads" sub-array may include bits for encoding the width of the road or the slope of the road; the "built-up areas" sub-array may include bits for encoding a classification or category of the built-up area (e.g., "commercial area", "residential area", "industrial area", "park", and the like); the "oceans" sub-array may encode the ocean depth at the grid element location; and the "land terrain" sub-array may encode the elevation or slope of the terrain at the grid element location.

Referring back to FIGS. 1 and 2, the CRV data model 134 generated by map encoder 114 of server 110 is accessible over a computing network by map data applications 124 operating on remote computing devices 120. The map data application 124 can extract relevant information, such as selected geographic attributes at a particular geographic location, and then present the extracted information in a desired manner. For example, map data application 124 may extract a map image of the current location of the computing device 120, and then display a map image that highlights geographic attributes of interest to the user, as well as provide warnings or notification relating to the user. For example, if the user is the pilot of an aircraft, map data application 124 may extract height information along the flight route of the aircraft from CRV data model 136, and present the pilot with a warning notification if the aircraft altitude descends below a predetermined "danger threshold". For example, a warning graphic or other symbol or color may be presented on display 126 overlaid on to the map image depicting external environment of aircraft along its flight route in real-time.

Figure 5A:
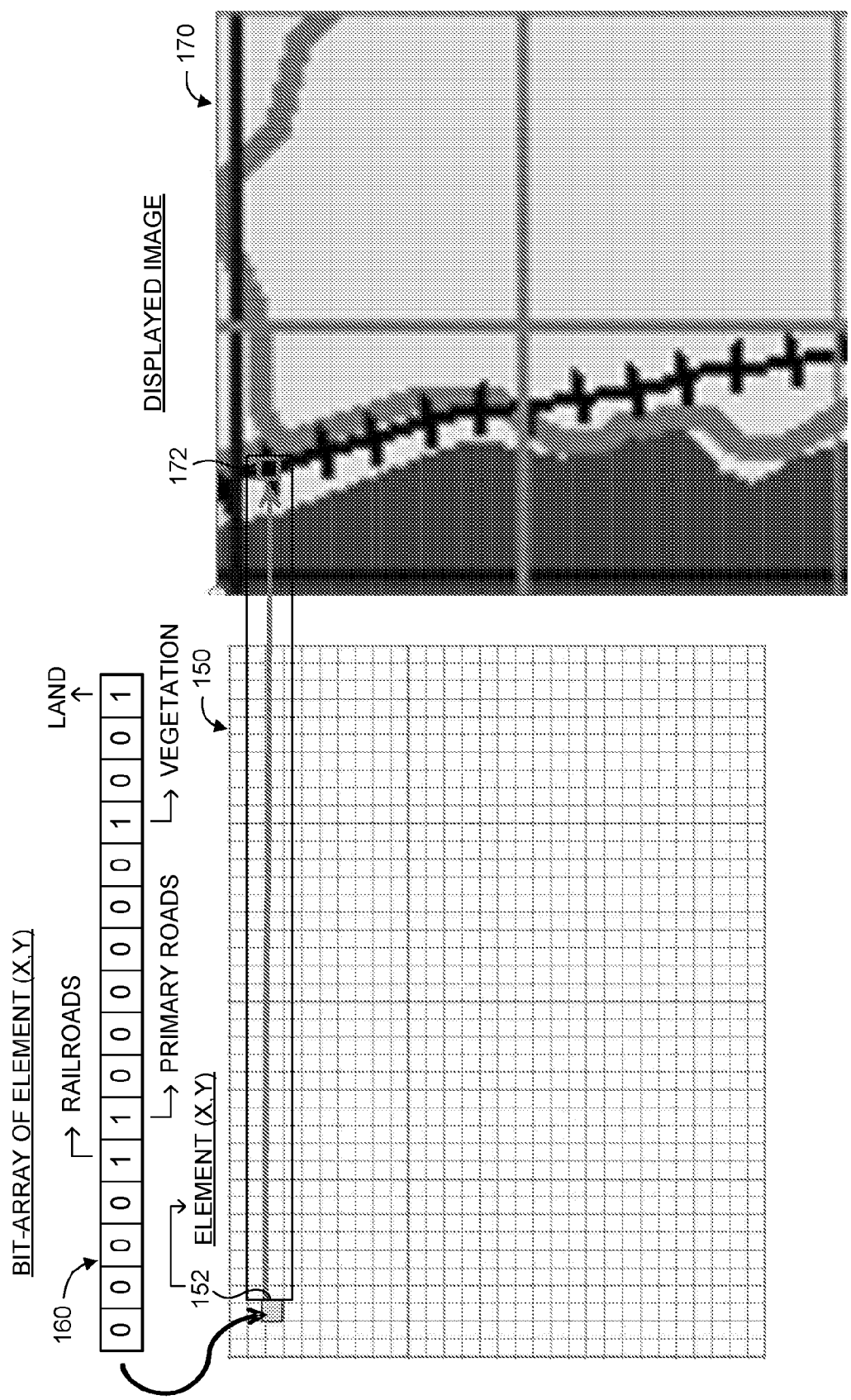
FIG. 5A is a schematic illustration of decoding the alternate map data structure of FIG. 4B to display a map image presenting the geographic attributes of a selected area, operative in accordance with an embodiment of the present invention.

Reference is now made to FIG. 5A, which is a schematic illustration of decoding the alternate map data structure of FIG. 4B to display a map image, referenced 170, presenting the geographic attributes of a selected area, operative in accordance with an embodiment of the present invention. The CRV map data structure encodes grid 150 of elements represents spatial coordinates of a geographic area. To display a map image of at least a portion of the geographic area represented by grid 150, the relevant grid elements of the CRV data structure are decoded. In particular, the geographic attributes at the area to be displayed are obtained from the bit-array of the relevant grid elements.

For each CRV element corresponding to the geographic area to be displayed, map data application 124 (FIG. 1) sequentially scans each bit of the element bit-array in descending order of priority, i.e., beginning with the highest priority layer bit position. If a bit indicates that the corresponding attribute layer is present (i.e., bit value is "1"), and if that layer is to be displayed, then application 124 displays the attribute at that element location with its respective attribute properties (i.e., according to the assigned color palette for that layer). If the bit indicates that the corresponding layer is absent (i.e., bit value is "0"), or if the layer is present but is defined to not be displayed, then the next highest priority bit position is scanned. The decoding process continues in the above manner until the entire bit-array has been scanned. If all of the bits in the element bit-array have a value of "0", then application 124 assigns a "transparent value" (layer #1) to that grid element, and then moves on to the next element.

For example, bit-array 160 of grid element 152 at coordinate location (x,y) is encoded with a binary value of: "[MSB]0000110000001001[LSB]". Map data application 124 scans bit-array 160 beginning at the MSB bit position ("bit #16") defined with the highest priority value (priority=16, referring to chart 140). Bit position #16 has a value of "0", indicating that the corresponding attribute layer, in this case the "grid layer", is not present or not to be displayed. Application 124 then checks the next bit position #15 which has the next highest priority value (priority=15). Bit position #15 also has a value of "0", indicating that the "international boundaries layer" corresponding to that bit also is not present at grid element 152. Application 124 continues to scan the bits of bit-array 160 in descending order of priority, until encountering a bit having a value of "1", such as at bit position #12 corresponding to the "railroads layer". Application 124 ascertains whether the layer is to be displayed, and if so, displays the railroads attribute at grid element 152 with a "black" color (referring to chart 140), based on the railroads layer #16 generated during the encoding process (as shown in FIG. 4A). Application 124 may use a look-up table (LUT) to determine the attribute properties, such as the correct color, associated with the layer to be displayed. The layers are displayed in the manner in which they were generated during the encoding process, and so the line pattern and line width are already predefined from the standpoint of application 124. For example, railroads layer #16 is predefined as having a rail type line pattern of 2 pixels in width. Application 124 further encounters bit position #11 corresponding to the "primary roads layer" having a value of "1", and displays (if applicable) the primary roads attribute at grid element 152 with an "indigo" color. Application continues decoding the remainder of bit-array 160 to determine the presence or absence of the other geographic attributes, accordingly. In particular, the "vegetation-trees attribute" (bit position #4) is displayed with a "bright green" color, and the "land attribute" (bit position #1) is displayed with a "portofino" color, while all other attributes are determined to be absent at coordinate location (x,y) of grid element 152. Application 124 then moves on to the next element of grid 150 and scans the respective bit-array in the same manner. After all relevant elements have been scanned, application 124 displays an image, referenced 170, depicting the respective geographic attributes at the map area of the scanned elements. Image pixel 172 correlates to grid element 152.

Figure 5B:
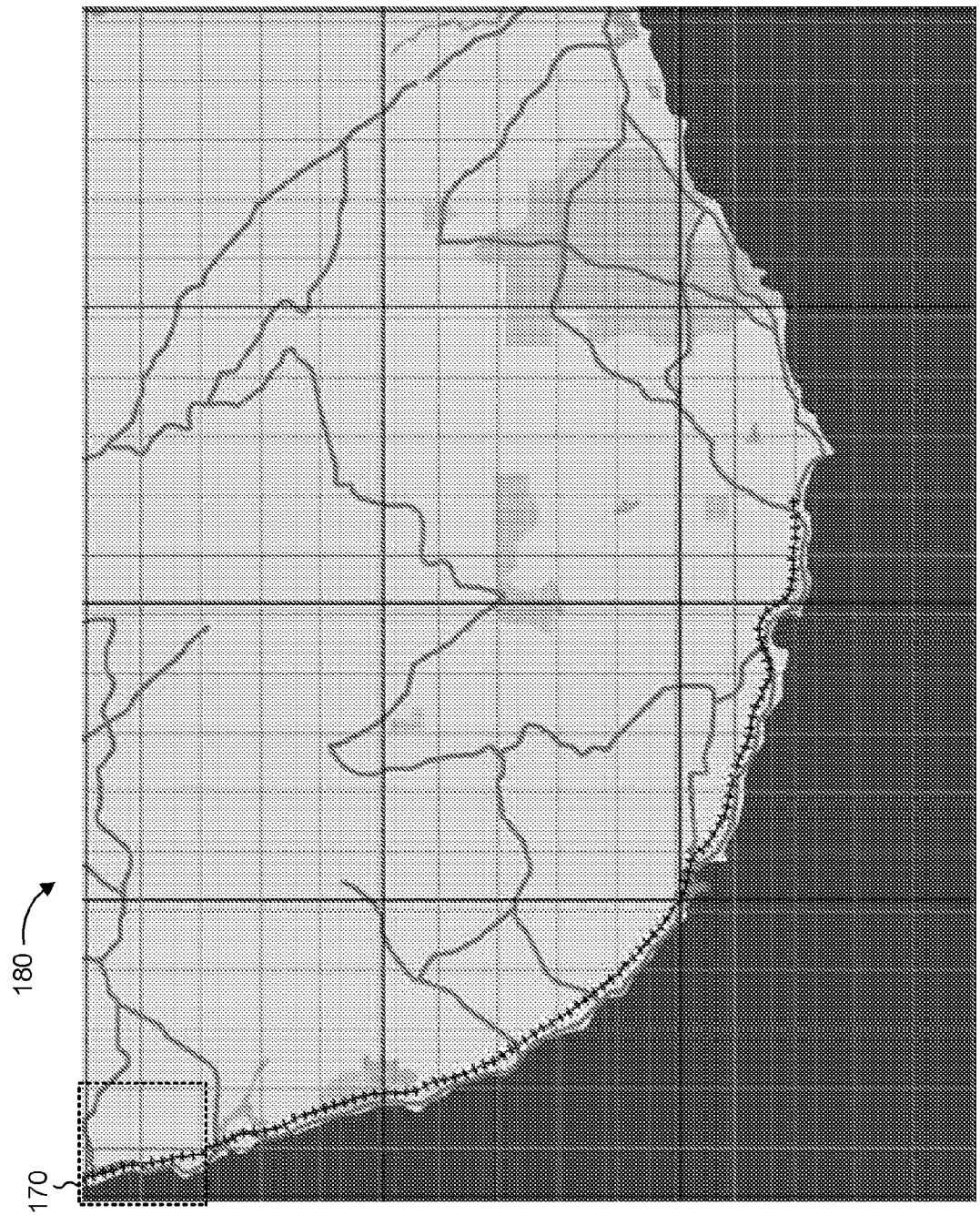
FIG. 5B is a schematic illustration of a complete displayed map image corresponding to the entire area of the grid of FIG. 5A, operative in accordance with an embodiment of the present invention.

Reference is further made to FIG. 5B, which is a schematic illustration of a complete displayed map image, generally referenced 180, corresponding to the entire area of grid 150 (FIG. 5A). Image 180 depicts the geographic attributes (defined for displaying) at the respective geographic locations represented by each of the grid elements (e.g., pixels) of grid 150, where image portion 170 represents the particular grid elements displayed in FIG. 5A. It is noted that the grid layer is displayed on image 180 to enhance viewer comprehension, such as to provide auxiliary information relating to map scaling factors in the image.

Map data application 124 may display the selected attribute layers sequentially on the map image, such as displaying individual layers in ascending order of priority. Reference is made to FIGS. 6A, 6B and 6C. FIG. 6A is a schematic illustration of a map image, referenced 192, depicting a first set of attribute layers, operative in accordance with an embodiment of the present invention. FIG. 6B is a schematic illustration of a map image, referenced 194, depicting a second set of attribute layers overlaid on the map image 192 of FIG. 6A. FIG. 6C is a schematic illustration of a map image, referenced 196, depicting a third set of attribute layers overlaid on the map image 194 of FIG. 6B. Map image 192 displays the "land layer" (layer #2; priority=1) and the "oceans layer" (layer #3; priority=2) of a selected geographic area. The land layer is displayed in a "portafino" color, while the oceans layer is displayed in a "blue" color. Map image 194 displays the "built-up areas layer" (layer #8) in "pumpkin orange" color, overlaid onto image 192, as the built-up areas layer (priority=6) has a higher priority than both the land layer (priority=1) and oceans layer (priority=2) of image 192. Map image 196 displays a further group of layers relating to "transportation attributes" overlaid onto image 194. In particular, map image 196 displays the "primary roads layer" (layer #15; priority=11) in "citron" color, and the "railroads layer" (layer #16; priority=12) in "black" color, overlaid onto the lower priority layers (built-up areas, oceans, land) shown in images 192 and 194.

The different geographic attributes of a displayed map image may be visually represented in an intuitive manner, so as to enhance the situational awareness of the viewer (e.g., for an aircraft pilot observing a map image while navigating the aircraft along a flight route). For example, grass and trees in the geographic area are depicted on the map image with a "bright green" color, generally linked to physical manifestation of such vegetation attributes. Similarly, the various water-related attributes, such as "oceans", "rivers & streams", "inland water", and "canals", are depicted with various shades of "blue", which is intuitively associated with water. The geographic attributes may also be displayed with supplemental visual enhancements or graphical elements, such as symbols of different intensities, shapes and/or sizes, such as to indicate the relative importance or severity level of the respective attribute/layer. For example, the presence of an obstacle along the flight route determined to be a high likelihood of a potential collision may be displayed in bold or otherwise appear more visually captivating in the map image, as compared to other attributes of lesser importance.

Figure 7:
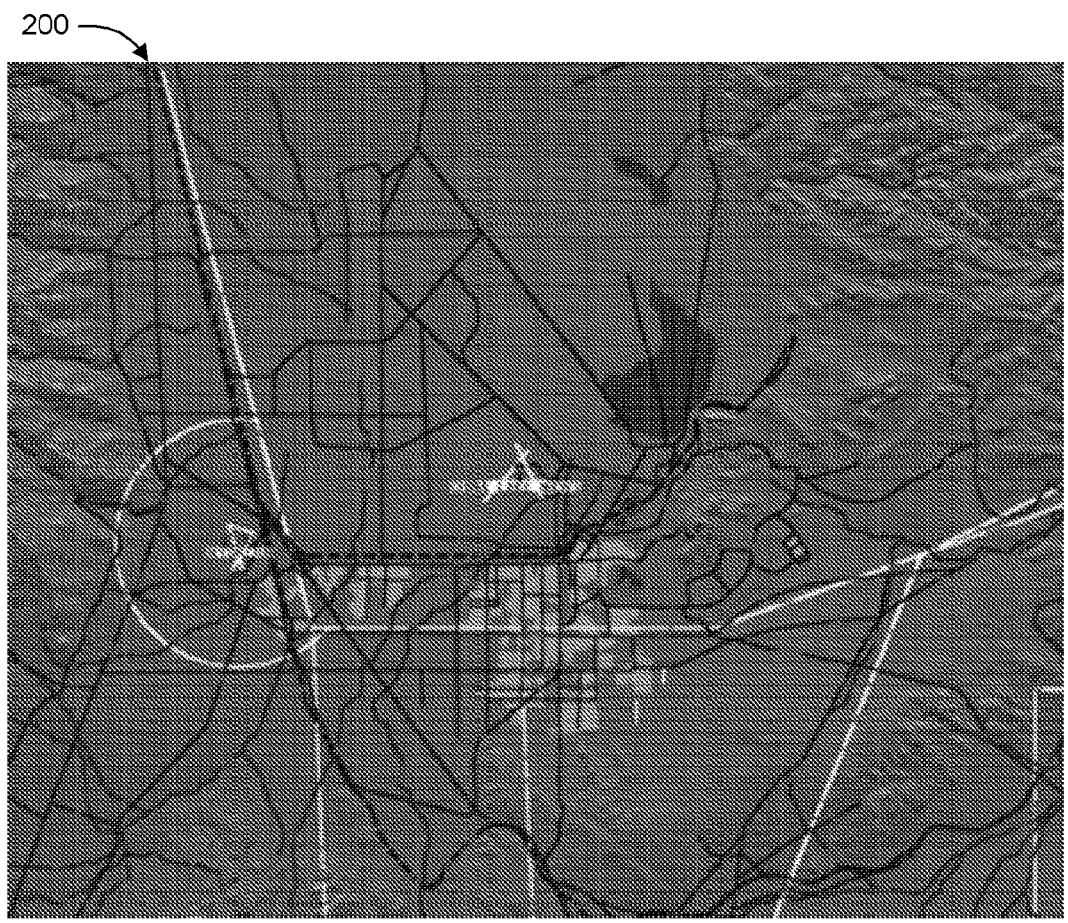
FIG. 7 is a schematic illustration of a map image displaying selected attribute layers, operative in accordance with another embodiment of the present invention.

Reference is now made to FIG. 7, which is a schematic illustration of a map image, referenced 200, displaying selected attribute layers, operative in accordance with another embodiment of the present invention. Map image 200 displays the following layers: "land" (gray color); "inland water bodies" (blue color); "closed aerial space" (white color); "land contour lines" (orange color); "built-up areas" (yellow color); "roads" (black color, solid line pattern); "railroads" (black color, dashed line pattern); and "airport runways" (white color, with text indication). It is noted that geographic attributes displayed in similar or identical color palettes may be differentiated based on context, if necessary (e.g., differentiating between the "vegetation-grass" (layer #5) and "vegetation-trees" (layer #6) attributes, both of which are displayed with identical color values of "bright green").

The term "image" as used herein may refer to a video image or a plurality of image frames presented in sequence. In accordance with an embodiment of the present invention, a video image may be displayed in real-time and continuously updated to correspond to the actual environment in relation with the current location and direction of a moving platform, such as a vehicle or an aircraft.

According to an embodiment of the present invention, a user may establish different priorities for displaying certain attribute layers, to modify or override the existing or "default" priorities assigned to the layers. The priorities may be set manually by a user, or may be established automatically based on predefined conditions, such as to better suit particular requirements. In particular, the priorities for different attribute layers may be updated dynamically in accordance with real-time environmental conditions. For example, if a user is attempting to identify a specific building of interest in a map image, then the "built-up areas" layer can be temporarily assigned a higher priority value (e.g., greater than the default priority of "6"), while other layers that are less relevant for the task at hand, such as "rivers and streams", "canals", or "tunnels", may have their respective priorities decreased. For another example, if a user is travelling over a geographic area with a tropical climate, then the priority of the "vegetation" attributes may be dynamically decreased as their displaying may obscure other attributes that are less abundant in such areas.

According to another embodiment of the present invention, the bit-array assigned to a grid element may further include auxiliary data, such as information relating to the attributes of neighboring grid elements. For example, a given bit in the bit-array may provide an indication of the transition to an adjacent grid element (representing an adjacent geographic location) for the respective attribute layer associated with that bit. For example, if a bit position "X" is related to a given layer (e.g., "rivers & streams") at the respective grid element location (e.g., coordinates x,y), then an adjacent bit position ("X+1") of the same bit-array (i.e., of grid element x,y) can be used to indicate if the same layer attribute is present at an adjacent grid element (i.e., whether a river is also present at coordinate location x+1, y+1), where a "1" binary value indicates a "positive transition" while a "0" binary value indicates a "negative transition".

It will be appreciated that the CRV data representation of the present invention allows for the extraction and displaying of selected geographic attributes at a selected geographic area quickly and efficiently. The rapid and efficient processing of the map data results from the following factors: the predefined partition of geographical regions in fixed grid elements for a given land area; the unique encoding of geographic attributes as separate bit-layers, which also allows for easily adding new bit-layers or removing unneeded bit-layers as necessary; the efficient lossless compression of the CRV data model, which allows for rapid transferring of the required data to local memory for processing; and that the geographic data application need only to display the selected geographic attributes in accordance with their assigned colors and/or patterns, without needing to dedicate additional resources for further processing to determine relevant content of the different bit-layers. Moreover, the CRV data model of the present invention allows for efficient data compression, thus reducing the storage space occupied by the stored map data.

Figure 8:
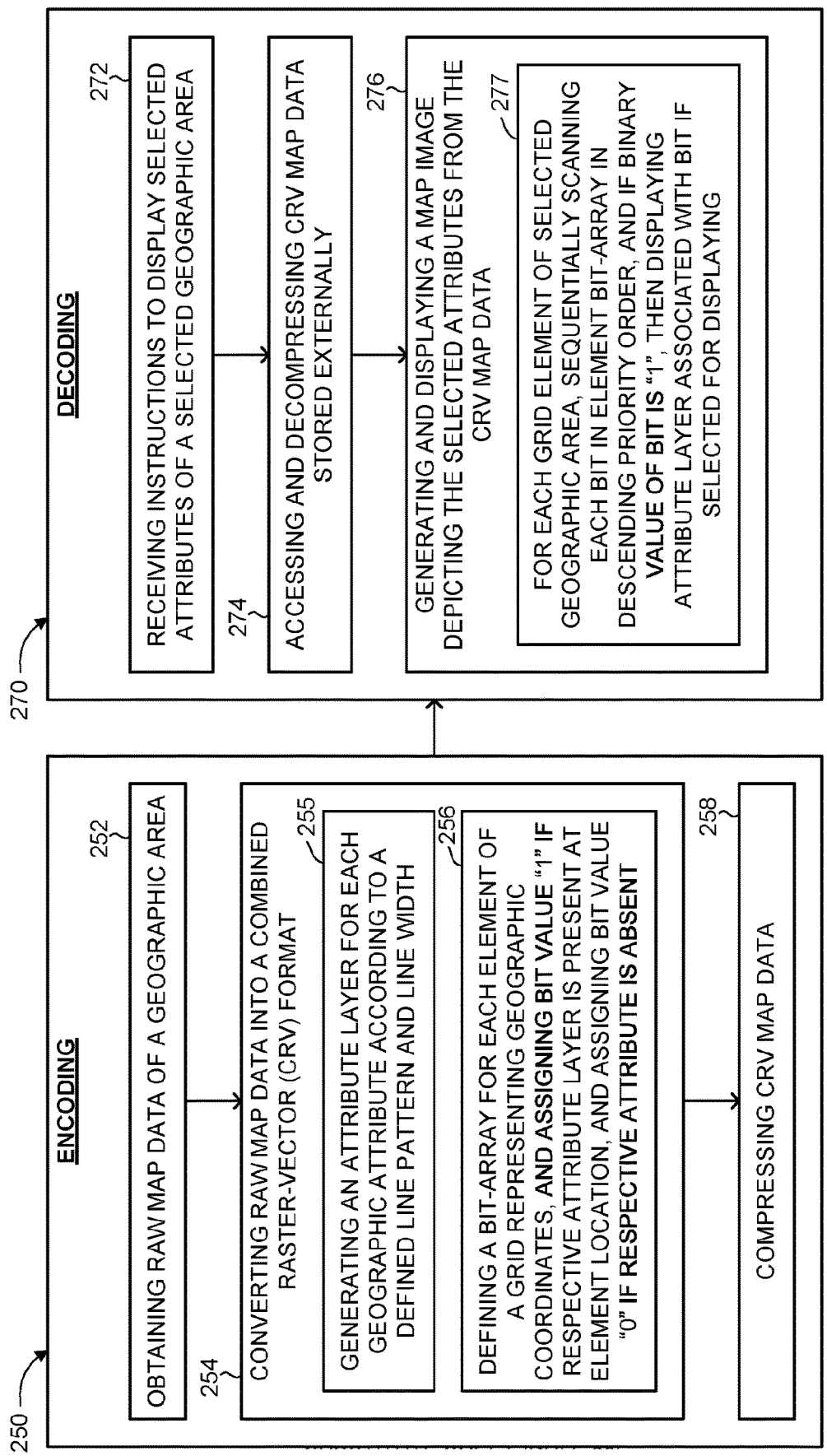
FIG. 8 is a block diagram of a method for representing and obtaining geographical information, operative in accordance with an embodiment of the present invention.

Reference is now made to FIG. 8, which is a block diagram of a method for representing and obtaining geographic information, operative in accordance with an embodiment of the present invention. The geographic information is represented in a CRV data format in an initial encoding process, generally referenced 250. The encoded CRV map data may then be displayed by a computing application in a subsequent decoding process, generally referenced 270.

Referring to encoding process 250, in procedure 252, raw map data of a geographic area is obtained. Referring to FIGS. 1 and 2, map data encoder 114 of central server 110 receives raw vector map data 132 from database 108.

In procedure 254, the raw map data is converted into a combined raster-vector format. Procedure 254 includes a first sub-procedure 255, in which an attribute layer is generated for each geographic attribute according to a defined line width and line pattern. Referring to FIGS. 1 and 4A, map data encoder 114 obtains vector layer information from vector map model 132, and generates corresponding geographic attribute layers 144, such as, for example, an "oceans" layer, a "built-up areas" layer, a "vegetation-trees" layer, and an "inland water" layer. Each layer is generated according to a line pattern and line width associated with the layer. Each layer is further assigned a priority level, denoting the order in which the layers are to be decoded or displayed. Procedure 254 includes a second sub-procedure 256, in which a bit-array is defined for each element of a grid representing geographic coordinates, where a bit value of "1" is assigned in the bit-layer if the respective attribute layer is present at the element location, and a bit value of "0" is assigned in the bit-layer if the respective attribute layer is absent. Referring to FIGS. 1 and 4B, map data encoder 114 scans each element of grid 150, determines which geographic attributes are present at the spatial location of the grid element, and encodes the element with a bit-array having a binary value informing the geographic attributes at the element location. For example, grid element 152 at location (x,y) is encoded with a bit-array 160 having a binary value of "[MSB]0000110000001001[LSB]", indicating the presence of attribute layers for "land" (bit-position #1); "ocean" (bit-position #2); "vegetation—trees" (bit-position #4); "primary roads" (bit position #11); and "railroads" (bit position #12), while all other attributes are absent at location (x,y).

In procedure 258, the CRV map data is compressed. Referring to FIGS. 1 and 2, map data encoder 114 compresses CRV map data 134 with a lossless compression format, resulting in compressed CRV map structure 136 which is stored in memory 118 and/or database 108.

Referring now to decoding process 270, in procedure 272, instructions to display selected attributes of a selected geographic area is received. Referring to FIG. 1, a map data application 124 operating on a computing device 120 receives a user request to display a map image depicting certain geographic attributes. For example, computing device 120 is associated with an aircraft in flight, and map data application 124 receives a request to display all natural (i.e., not artificial or man-made) topographical features along the flight route of the aircraft.

In procedure 274, CRV map data stored externally is accessed and decompressed. Referring to FIGS. 1 and 2, map data application 124 accesses compressed CRV map data 136 stored at external database 108 and/or memory 118 of server 110, and decompresses compressed CRV map data 136 to produce (decompressed) CRV map data 134 ready for use.

In procedure 276, a map image depicting the selected attributes is generated and displayed from the CRV map data. Procedure 276 includes sub-procedure 277, in which, for each grid element representing the selected geographic area, each bit in the element bit-array is sequentially scanned in descending priority order, and if the binary value of the bit is "1", then the attribute layer associated with the bit is displayed if selected for displaying. Referring to FIGS. 1 and 5A, map data application 114 identifies the grid elements of grid 150 representing the selected geographic area to be displayed, and for each relevant grid element, sequentially scans each bit of the element bit-array in descending order of priority. If a bit value is "1" and if the corresponding attribute layer is to be displayed, then application 124 displays the attribute at that element location with its assigned color palette and other attribute properties. For example, application 124 scans bit-array 160 of grid element 152 beginning at the MSB bit position ("bit #16") defined with the highest priority value. Bits having a value of "0" indicate that the corresponding attribute layer is absent or not to be displayed. When a bit value of "1" is encountered, such as at bit position #12, application 124 ascertains whether the corresponding layer is to be displayed, and if so, displays the layer attribute ("railroads") at the grid element 152 with its respective display properties ("black" color). The layer is displayed according to its predefined line pattern and line width, as generated during encoding process 250. It is noted that only the selected attribute layers (e.g., layers #1-#4, #11, #12) are extracted, while the rest of the (20) layers are not required and thus not extracted, providing relatively quick data processing and response time. Application 124 scans the element bit-arrays for all relevant grid elements, and generates map image 170 depicting the selected attributes at the selected geographic area. Display 126 of computing device 120 displays the generated map image 170.

The map image may depict the natural terrain features along the flight path of an aircraft, where the map image is updated in real-time to correspond to the current aircraft location (or projected location). The geographic attributes may be displayed in an intuitive manner, such as with a color representing a physical manifestation of the attribute, so as to enhance the situational awareness of the viewer.

Application 124 may further provide a notification or supplementary information relating to the displayed map image. Such information may also be provided in a non-visual manner. For example, a warning or notification, such as an audible alarm or a bolded graphical symbol, may be presented to a user of computing device 120, such as to indicate that the aircraft altitude has descended below a danger threshold level, or to indicate a potential obstacle (e.g., a natural terrain feature) identified along the projected aircraft flight path. Application 124 may also retrieve and provide particular characteristics relating to geographic attributes of interest, such as, for example, the elevation of a selected terrain feature.

The user may also provide updated instructions to map data application 124, such as to select different geographical attributes to be depicted on the displayed map image, or to modify settings of the displayed image (e.g., to change the viewing angle or magnification level, or to focus on a selected portion or region of interest on the map image).

According to an embodiment of the present invention, the displayed map image may be displayed in alignment with the user line-of-sight (LOS), or an alternative LOS vector. For example, map data application 124 may obtain the LOS of the aircraft pilot (e.g., as detected via a head tracker or eye tracker), and generate a suitable map image to be displayed such that the pilot views a synthetic image (depicting selected geographic attributes) superimposed over the background view of the external environment (e.g., through a HUD or HMD), in alignment with the pilot LOS. The displayed image may alternatively be aligned with an alternative LOS vector, such as the aircraft boresight or a sight line of display 126, where the LOS vector may be indicated manually by the user or designated automatically in accordance with preconfigured settings.

The method of FIG. 8 is generally implemented in an iterative manner, such that at least some of the procedures are performed repeatedly and/or continuously, in order to provide geographic information linked to the real-time location of a moving platform over a sequence of image frames. For example, the method procedures are performed iteratively so as to enable the display of a real-time map image (or image frames) presenting selected geographic attributes, where the displayed image corresponds to the changing geographic location of the moving platform for at least a selected duration.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A geographic information system, comprising:
a server computing device including a processor and a map data encoder executed by the processor; and
at least one client computing device including a processor and a map data application executed by the processor,
wherein the map data encoder is configured to encode raw map data into a map data structure being a combined raster and vector representation comprising a grid of elements representing spatial coordinates of a geographical area, each of the grid elements comprising a bit array of fixed bit-length, wherein each bit of at least a portion of the bit-array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit-array provides an indication of the geographic attributes at the respective location of the grid element, and
wherein the map data application is configured to retrieve geographic information relating to a selected location of the geographical area, by extracting at least one geographic attribute at the selected location from the map data structure.

2. The geographic information system of claim 1, wherein each respective geographic attribute is encoded as an attribute layer comprising a line pattern and a line width.

3. The geographic information system of claim 2, wherein the attribute layer further comprises a color value for displaying the respective geographic attribute.

4. The geographic information system of claim 2, wherein the attribute layer further comprises a priority value designating an order for decoding the attribute layers of the grid element.

5. The geographic information system of claim 2, wherein at least one sequence of bits of the bit-array is associated with a respective attribute layer, such that the binary value of one bit in the sequence indicates the existence of the respective geographic attribute at the respective location, and the binary value of at least another bit in the sequence provides further information relating to the respective geographic attribute at the respective location.

6. The geographic information system of claim 1, wherein at least a portion of the bit-array of the grid element indicates a transition to an adjacent grid element for the respective geographic attribute associated with the bit-array portion.

7. A method for obtaining geographic information, the method comprising the procedure of retrieving geographic information relating to a selected location of a geographical area, by extracting at least one geographic attribute at the selected location from a map data structure being a combined raster and vector representation comprising a grid of elements representing spatial coordinates of the geographical area, each of the grid elements comprising a bit array of fixed bit-length, wherein each bit of at least a portion of the bit array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit array provides an indication of the geographic attributes at the respective location of the grid element.

8. The method of claim 7, further comprising the preliminary procedure of converting a map data representation of the geographic area into the map data structure, by generating an attribute layer for each geographic attribute according to a defined line pattern and line width, and defining a bit-array for each element of the grid.

9. The method of claim 8, wherein generating an attribute layer further comprises assigning a color value for displaying the respective geographic attribute of the attribute layer.

10. The method of claim 9, further comprising the procedure of generating and displaying a map image depicting selected geographic attributes at the selected location, by sequentially scanning each bit in the bit-array of a grid element in descending order of priority, for each grid element of the selected location, and if the bit value of the scanned bit is "1" and the geographic attribute associated with the bit is selected, then displaying the associated geographic attribute layer according to the assigned color.

11. The method of claim 8, wherein generating an attribute layer further comprises assigning a priority value designating an order for decoding the attribute layers of the grid element.

12. The method of claim 7, wherein the selected location of a geographical area comprises the real-time location of a moving platform.

13. A computing device comprising a processor executing a map data application, configured to retrieve geographic information relating to a selected location of a geographical area, by extracting at least one geographic attribute at the selected location from a map data structure being a combined raster and vector representation comprising a grid of elements representing spatial coordinates of the geographical area, each of the grid elements comprising a bit array of fixed bit-length, wherein each bit of at least a portion of the bit array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit array provides an indication of the geographic attributes at the respective location of the grid element.

14. The computing device of claim 13, further comprising a display, configured to display a map image depicting selected geographic attributes at the selected location, wherein the map data application is configured to generate the map image by sequentially scanning each bit in the bit-array of a grid element in descending order of priority, for each grid element of the selected location, and if the bit value of the scanned bit is "1" and the geographic attribute associated with the bit is selected, then the associated geographic attribute layer is displayed according to an assigned color.

15. The computing device of claim 13, further comprising a location indicator, configured to determine the real-time location of the computing device, wherein the selected location of a geographical area comprises the determined real-time location of the computing device.

16. A system for obtaining geographic information over a network, the system comprising:
  a database, comprising a map data structure being a combined raster and vector representation comprising a grid of elements representing spatial coordinates of a geographical area, each of the grid elements comprising a bit array of fixed bit-length, wherein each bit of at least a portion of the bit array is associated with at least one respective geographic attribute, by assigning a bit value of "1" if the respective geographic attribute is present at the respective location of the grid element, and assigning a bit value of "0" if the respective geographic attribute is absent at the respective location of the grid element, such that the binary value of the bit array provides an indication of the geographic attributes at the respective location of the grid element; and
  a map data application, operating on a client computing device communicatively coupled with the database over a network, the map data application configured to retrieve geographic information relating to a selected location of the geographical area, by extracting at least one geographic attribute at the selected location from the map data structure.

17. The system of claim 16, further comprising a map data encoder, operating on a server computing device communicatively coupled with the database over a network, the map data encoder configured to convert a map data representation of the geographic area into the map data structure, by generating an attribute layer for each geographic attribute according to a defined line pattern and line width, and defining a bit-array for each element of the grid.

18. The system of claim 17, wherein the map data encoder is configured to assign a color value to the generated attribute layer, for displaying the respective geographic attribute of the attribute layer.

19. The system of claim 17, wherein the map data encoder is configured to assign a priority value to the generated attribute layer, designating an order for decoding the attribute layers of the grid element.

20. The system of claim 16, wherein the map data application is configured to generate and display a map image depicting selected geographic attributes at the selected location, by sequentially scanning each bit in the bit-array of a grid element in descending order of priority, for each grid element of the selected location, and if the bit value of the scanned bit is "1" and the geographic attribute associated with the bit is selected, then the associated geographic attribute layer is displayed according to an assigned color.

* * * * *